(12) United States Patent
Hodapp, Jr.

(10) Patent No.: US 7,047,346 B2
(45) Date of Patent: May 16, 2006

(54) TRANSPARENT FIBER CHANNEL CONCENTRATOR FOR POINT TO POINT TECHNOLOGIES

(75) Inventor: Don J. Hodapp, Jr., Maple Grove, MN (US)

(73) Assignee: Storage Technology Corporation, Louisville, CO (US)

( * ) Notice: Subject to any disclaimer, the term of this patent is extended or adjusted under 35 U.S.C. 154(b) by 512 days.

(21) Appl. No.: 10/039,879

(22) Filed: Dec. 31, 2001

(65) Prior Publication Data
US 2003/0126344 A1    Jul. 3, 2003

(51) Int. Cl.
*G06F 13/36* (2006.01)
*G06F 3/00* (2006.01)

(52) U.S. Cl. ............ 710/306; 710/11; 370/464; 370/434; 398/25

(58) Field of Classification Search ........... 370/464, 370/434; 398/25; 710/306, 11
See application file for complete search history.

(56) References Cited

U.S. PATENT DOCUMENTS

| | | | |
|---|---|---|---|
| 5,805,924 A * | 9/1998 | Stoevhase | 710/11 |
| 5,944,798 A * | 8/1999 | McCarty et al. | 709/251 |
| 6,005,849 A * | 12/1999 | Roach et al. | 370/276 |
| 6,014,370 A * | 1/2000 | Komatsu et al. | 370/248 |
| 6,014,715 A * | 1/2000 | Stoevhase | 710/11 |
| 6,185,203 B1 * | 2/2001 | Berman | 370/351 |
| 6,243,510 B1 * | 6/2001 | Rauch | 385/15 |
| 6,356,944 B1 * | 3/2002 | McCarty | 709/222 |
| 6,367,033 B1 * | 4/2002 | Jibbe | 714/37 |
| 6,609,165 B1 * | 8/2003 | Frazier | 710/36 |
| 6,665,742 B1 * | 12/2003 | Owen et al. | 710/10 |
| 6,772,270 B1 * | 8/2004 | Kurpanek | 710/316 |
| 6,904,053 B1 * | 6/2005 | Berman | 370/466 |
| 2002/0103945 A1 * | 8/2002 | Owen et al. | 710/10 |

\* cited by examiner

*Primary Examiner*—Khanh Dang
*Assistant Examiner*—Christopher Daley
(74) *Attorney, Agent, or Firm*—Yee & Associates, P.C.

(57) ABSTRACT

A data processing system for transferring data from a first plurality of data links to a second plurality of data links is provided. A data bridge is initialized. The data bridge is functionally connected on a first end to the first plurality of data links and on a second end to the second plurality of data links. A determination is made if a first data link within the first plurality of data links and a second data link within the second plurality of data links initiate a login parameter. Data is automatically transferred from a source data link within the first plurality of data links to a target data link within the second plurality of data links based on the login parameter.

26 Claims, 5 Drawing Sheets

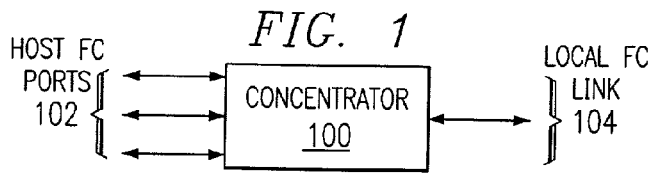
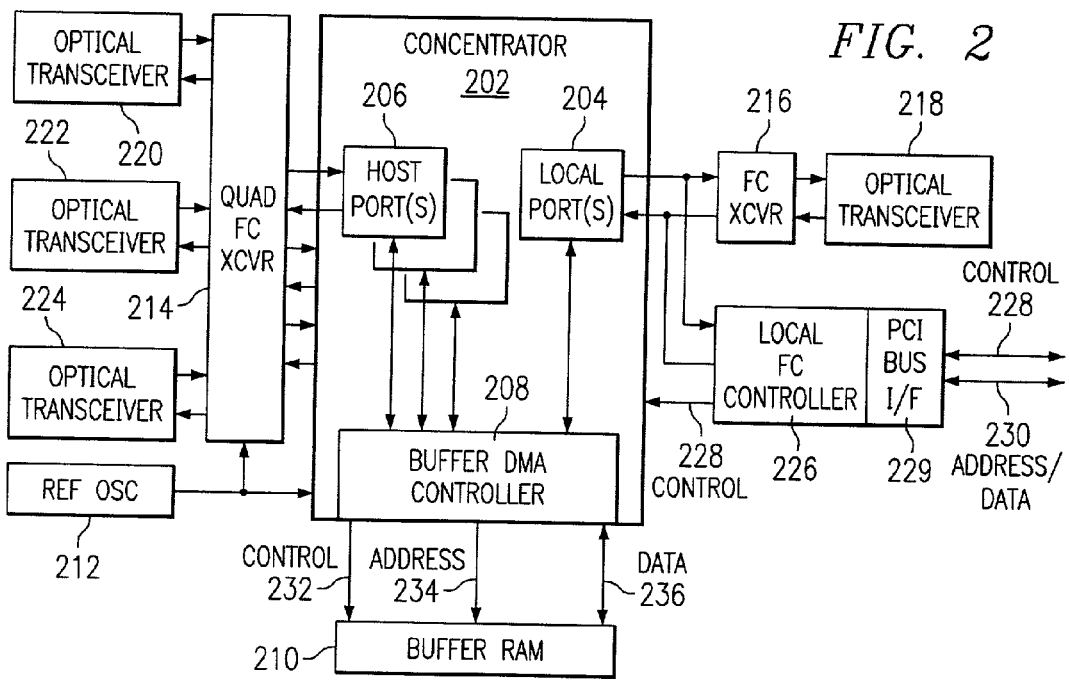
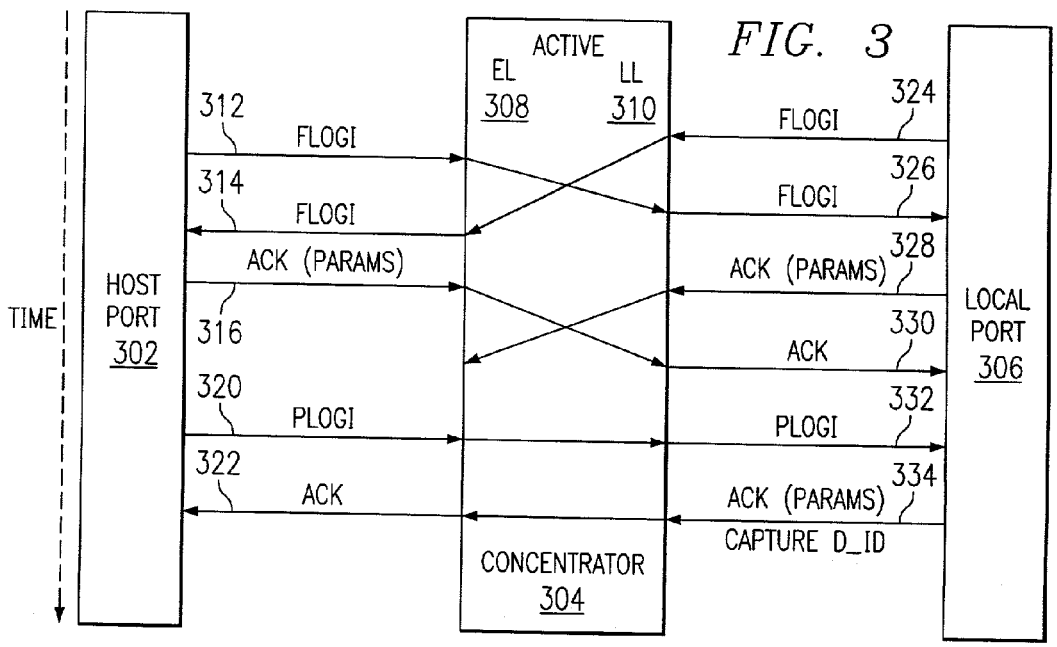

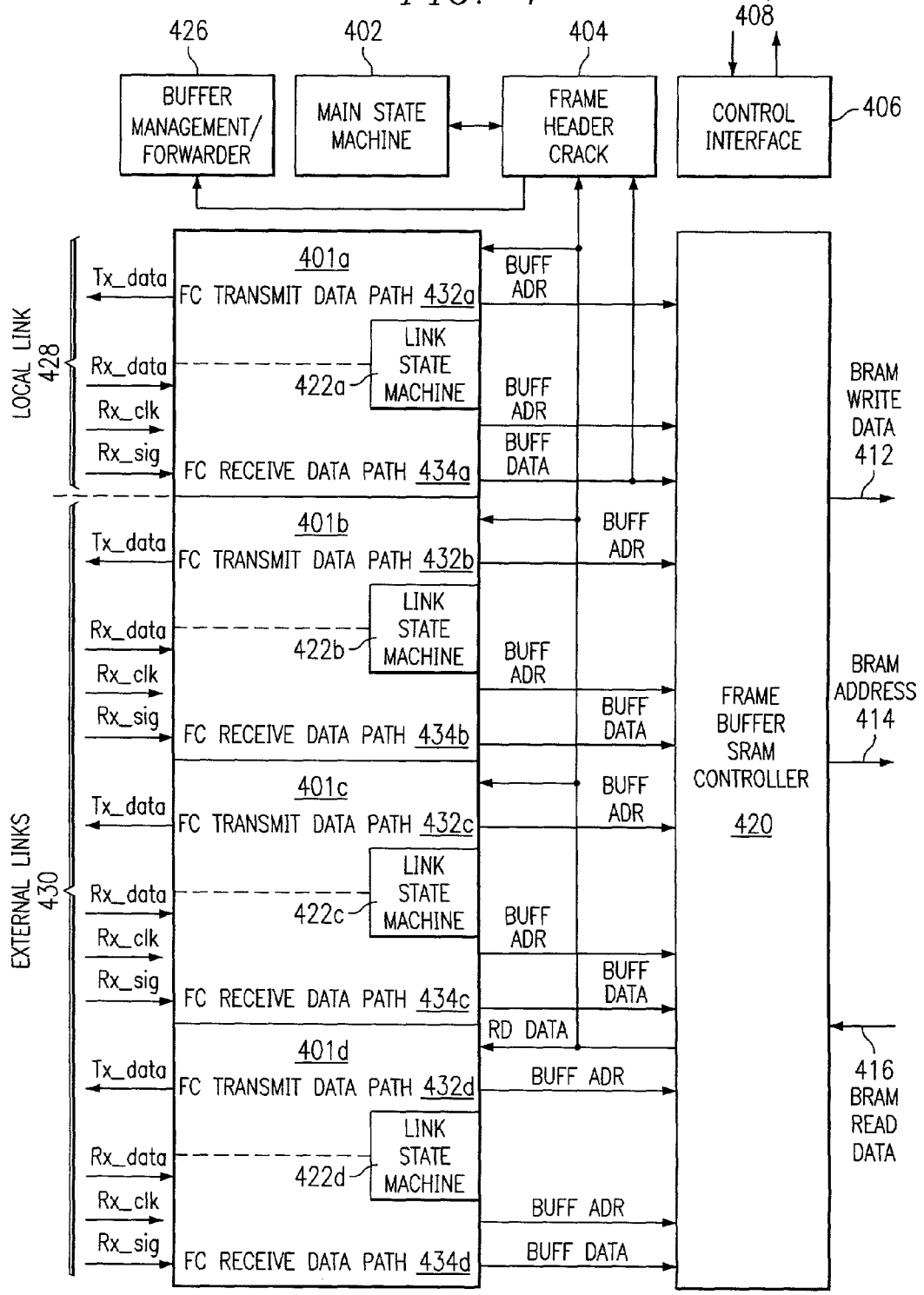

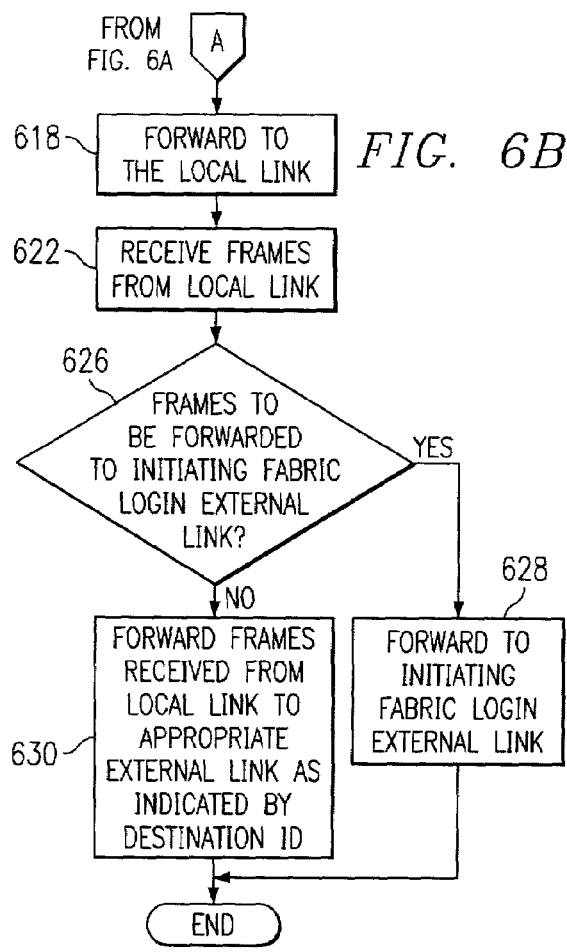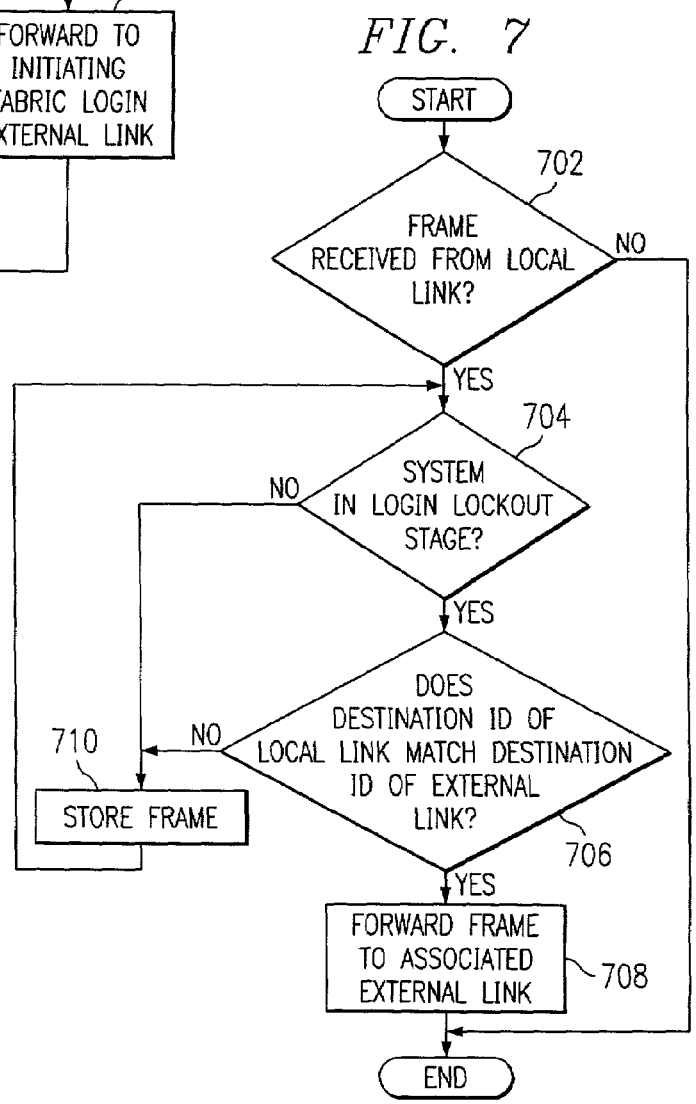

TRANSPARENT FIBER CHANNEL CONCENTRATOR FOR POINT TO POINT TECHNOLOGIES

TECHNICAL FIELD

The present invention is directed to a path balancing apparatus and method. In particular, the present invention is directed to an apparatus and method for multiplexing along multiple communication paths to a plurality of devices. Still more particularly, the present invention is directed to an apparatus and method for multiplexing along multiple communication paths to a plurality of devices without an external switching device.

DESCRIPTION OF RELATED ART

With the relatively high costs of a Fibre Channel data path, it is important to use as much of the available path bandwidth as possible. Currently, in many user environments, the data path may be underutilized with a single Fibre Channel (FC) port. One way to mitigate the costs of the data path is to provide connectivity for more than a single FC port so that the power of the data path may be fully utilized. If data paths are shared by FC ports with small incremental cost additions and no significant reduction in performance, the user may see greater host/device connectivity at a lower cost per port. Therefore, it would be advantageous to have an apparatus and method for sharing a data path between multiple FC ports.

SUMMARY OF THE INVENTION

The present invention provides a data processing system for transferring data from a first plurality of host data links to at least a single local data link. A data bridge is initialized. The data bridge is functionally connected on a first end to the first plurality of data links and on a second end to the second plurality of data links. A determination is made if a first data link within the first plurality of data links and a second data link within the second plurality of data links initiate a login parameter. Data is automatically transferred from a source data link within the first plurality of data links to a target data link within the second plurality of data links based on the login parameter.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 is an exemplary block diagram of connectivity for more than a single FC port in accordance with a preferred embodiment of the present invention;

FIG. 2 is an exemplary block diagram of a single port PCI mezzanine FC board is illustrated in accordance with a preferred embodiment of the present invention;

FIG. 3 is an exemplary block diagram of a class 3 login frame exchange between a host and the local FC port utilizing a fibre channel concentrator PCI mezzanine board in accordance with a preferred embodiment of the present invention;

FIG. 4 is an exemplary high level block diagram of a fibre channel concentrator integrated circuit hardware in accordance with a preferred embodiment of the present invention;

FIGS. 6A and 6B are exemplary flow diagrams describing the login initialization during a main active state in accordance with a preferred embodiment of the present invention; and FIG. 7 is an exemplary flow diagram describing the reception of a fabric login frame when the fibre channel concentrator is not in the login lockout state in accordance with a preferred embodiment of the present invention.

DETAILED DESCRIPTION OF THE PREFERRED EMBODIMENT

Figure 5:
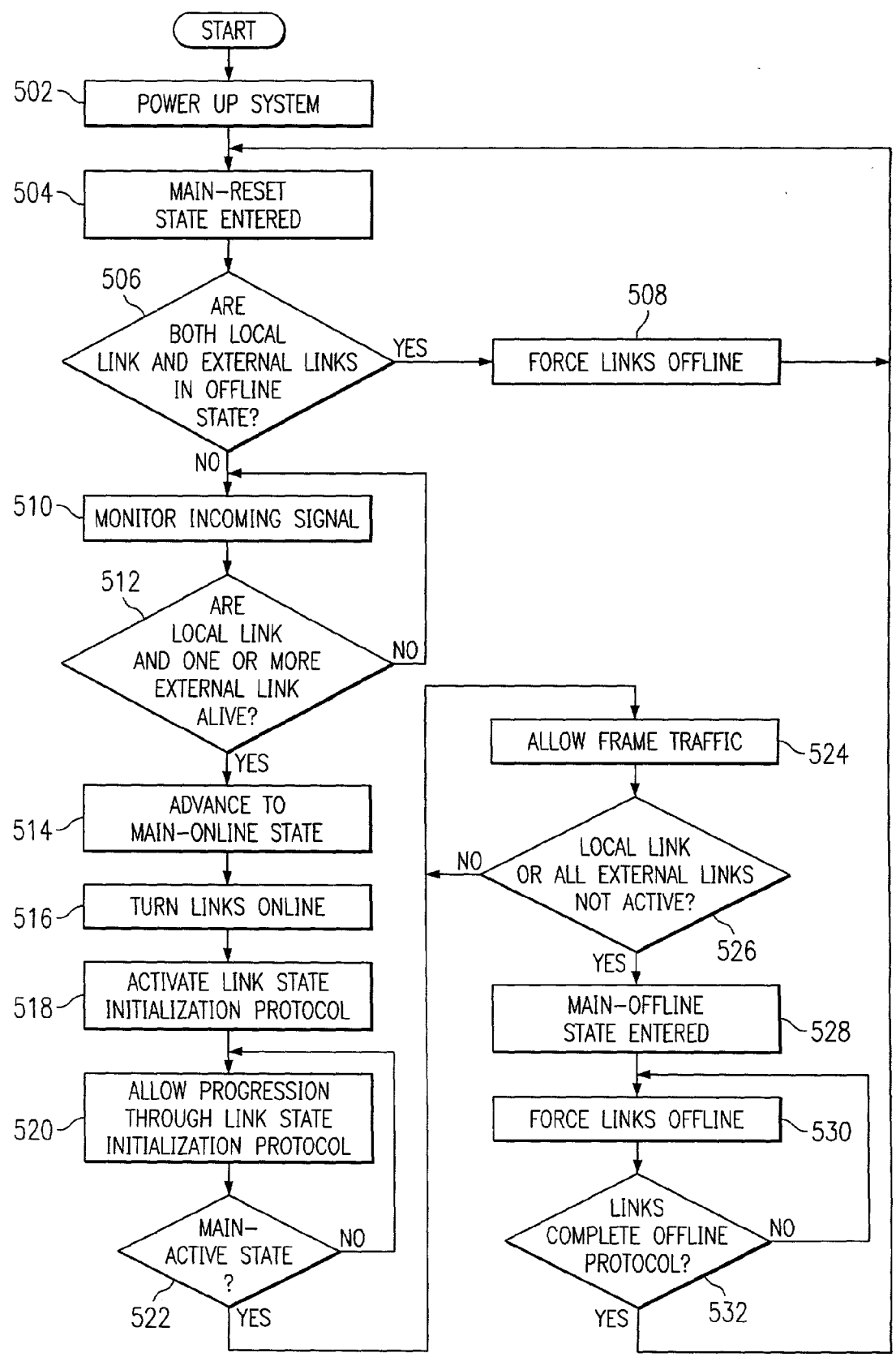
FIG. 5 is an exemplary flow diagram describing the states of fibre channel concentrator main state machine during the link initialization process in accordance with a preferred embodiment of the present invention.

The present invention provides an apparatus and method by which to directly connect a plurality of hosts to a single fibre channel (FC) link without the need of an external switch. This provides connectivity benefits in which the hosts are using only a portion of the link bandwidth. Hardware may be used to allow the hosts to transparently share the FC link into an FC controller. This hardware may acts as a FC frame multiplexer/demultiplexer with buffering capability. Receive frames from the plurality of external ports are multiplexed onto the local FC link. Transmit frames on the local FC link are routed by a destination identifier (ID) to one of the external ports.

FIG. 1 is an exemplary block diagram of connectivity for more than a single FC port in accordance with a preferred embodiment of the present invention. A solution to mitigation of the costs of the data path is to provide connectivity for more than a single FC port so that the power of the data path may be fully utilized. If data paths are shared by FC ports with small incremental costs additions and no significant reduction in performance, a greater host/device connectivity may be provided which results in a lower cost per FC port. Therefore, in this example, concentrator 100 merges FC point to point physical links 102 into a single FC link 104 by the processes of the present invention.

FIG. 2 is an exemplary block diagram of a single port PCI mezzanine FC board is illustrated in accordance with a preferred embodiment of the present invention. FIG. 2 provides further detail of FIG. 1. Concentrator device 202 may have several improved characteristics over the prior art. For example, concentrator device 202 may be transparent to external FC hosts/devices, require little or no management, data need only flow between the host port(s) and the local FC port and may support class 2 and class 3 frame exchanges. Concentrator 202 acts as a physical layer endpoint and provides a bridging function to move frames between external links and local links.

In this example, concentrator 202 may consist of a local FC port 204 and a plurality of host ports 206. One local port is shown in this example but any number of local ports may be employed in accordance with a preferred embodiment of the present invention. In addition, three host ports are shown in this example but any number of host ports may be employed in accordance with a preferred embodiment of the present invention. Furthermore, concentrator 202 may also consist of buffer direct memory access (DMA) controller 208.

Concentrator 202 may achieve a variety of states during the first stage of an initialization process, such as, for example, a. main_reset: the main_reset state may be entered at power-up or if both the local link and all of the external links have gone to an offline state. In the main-reset state, all of the links may be forced offline. Concentrator 202 then monitors an incoming signal from the links and if a local link and one or more of the external links have received a valid FC primitive sequence, the internal state of concentrator 202 advances to a main-online state.

b. main_online: the main_online state turns on all of the local links and external links if the links have received a valid primitive sequence and allowed to progress through a FC link state initialization protocol until the link is in an active state.

c. main_active: the main_active state is the normal active operating state. In the main_active state frame traffic may occur.

d. main_offline: the main_offline state occurs in concentrator 202 if a local link or all of the external links drop out of the main_active state at any time. While in the main_offline state, all of the active links are forced offline. When each link completes the offline protocol, concentrator 202 returns to the main-reset state in order to re-initialize the links.

The achievement of the variety of states during the first stage of an initialization process is further illustrated in FIG. 5.

After the main_active state is achieved, FC end-points (hosts and local links) initiate fabric login and port login in order to pass operating parameters. The initiation of fabric login and port login is important to concentrator 202 because buffer credits and port identification are established during the fabric and port logins. Special states are entered when fabric and port login frames are detected. An example of these special states is:

main-flogi (fabric login): Concentrator 202 enters this special state when a fabric login frame is received from an external link. While in this state, and main_plogi described below, only frames received from the same link as the fabric login are forwarded to the local link. Frames received from other external links are held in buffers, such as, for example, buffer RAM 210 until the login lockout is complete. Any login type frames, for example, flogi, plogi or acc (login acknowledge) received from the local link are forwarded to the initiating fabric login external link. Any other frames received from the local link are forwarded to the appropriate external link as indicated by the local link's destination identifier.

main_plogi (main port login): The main_plogi state is a continuation of the login process. The main_plogi state is entered when a port login frame is received from an external link. When a login acknowledge (acc) is received from the local link, the login process is complete and concentrator 202 returns to the main_active state. The destination identifier field of the acc (N-port parameters) is captured and used to compare with the destination identifier of subsequent frames to determine which external link to route outbound frames from the local link. The process of entering the special states when fabric and port login frames are detected is further illustrated in FIGS. 6A and 6B.

However, a condition may arise in which a fabric login is received from a local link and concentrator 202 is not in a login lockout state. This scenario is possible if the local link is the first to attempt a fabric login after initialization. If the destination identifier from the local link is a valid match for one of the external links, the frame is forwarded to the associated external link. Otherwise, if the destination identifier is not a valid match for one of the external links, the frame may be held in buffer RAM 210 by concentrator 202 until the login lockout states are properly entered due to a login initiated by an external state, at which point the frame is forwarded to the external link. This process is further explained in FIG. 7.

Data is routed through concentrator 202. In particular, concentrator 202 receives data from a variety of sources, which may be from, for example, a local link consisting of FC transceiver 216 and optical transceiver 218 or from a plurality of external links. In this example, optical transceivers 220, 222 and 224 in conjunction with quad FC transceiver 214 comprise the external links. The process of bringing external FC links and the local FC link from a power-up or reset state to receiving active data traffic may involve two main milestones. First, the local links and at least one external link may be brought to the active state. Then the local links and the external link ports complete the fabric login protocols and the port login protocols, which define the port identification (ID) and allow concentrator 202 hardware to direct frames to the proper external FC link destination.

Reference oscillator 212 provides a clock signal for the input and output of the data. Data received by concentrator 202 may send the data directly from local port 204 to host port(s) 206 through buffer DMA controller 208 or may store the data in buffer ram 210 via data link 236. In addition, control signal 232 and address signal 234 flows from buffer DMA controller 208 and buffer RAM 210. The present invention, as illustrated in FIG. 2, is not confined to providing data in only one direction. In other words, quad transceiver 214 may either output data to concentrator 202 or input data from concentrator 202. Likewise, FC transceiver 216 may either output data to concentrator 202 or input data from concentrator 202.

The operation of concentrator 202 is as follows. Optical transceivers, such as for example, optical transceivers 220, 222 and 224 may provide input into quad FC transceiver 214. Furthermore, quad FC transceiver 214 may accept input from reference oscillator (OSC) 212. Quad FC transceiver 214 takes the input from optical transceivers 220, 222 and 224 as well as the input from reference OSC 212 and in turn provides input into concentrator 202 via host port(s) 206. In turn, host port(s) 206 send the inputted data to buffer DMA controller 208. Buffer DMA controller 208 receives the data and sends the data to buffer RAM 210 for temporary storage. All received data passes through buffer RAM 210. Buffer RAM 210 is used to store data frames received on the links. Data is held in buffer RAM 210 until the frame is transmitted by one of the FC links. Although buffer RAM 210 supports bi-directional data, this implementation uses one of the data busses to write data and the other for read data so the data movement is unidirectional.

Data comes from host port 206 via both buffer DMA controller 208 as well as buffer RAM 210, and is then sent to local port 204. In one embodiment, local port 204 receives data from and transmits data to FC transceiver 216, which in turn transmits the data to optical transceiver 218. In another embodiment, local port 204 transmits data to and receives data from local FC controller 226, which in turn transmits data to and receives data from PCI bus interface 229. Local FC controller 226 receives control input 228 and address/ data input 230 through PCI bus interface 229 and provides control input 228 to concentrator 202.

FIG. 3 is an exemplary block diagram of a class 3 login frame exchange between a host and local port utilizing a fibre channel concentrator PCI mezzanine board in accordance with a preferred embodiment of the present invention. FIG. 3 illustrates class 3 login frame exchanges between host port 302 and local port 306 with concentrator 304 between host port 302 and local port 306.

In this example, main_active state transitions are illustrated. Concentrator 304 consists of external link port (EL) 308 and local link port (LL) 310. Link endpoint concentrator 304 is involved in buffer to buffer flow control across external link 308 and local link 310. However, concentrator 304 may not be involved in end to end flow control, therefore, acc frames may be forwarded in a similar manner as any other frame. Concentrator 304 monitors for login frames such as login frames 312 and 324 and captures remote buffer to buffer credit parameters for each link as the link is logged in. When the link is reset, the remote credit for each link is set to a value of 1. Separate Buffer-to-Buffer (BB) credit counters are maintained for each link and frames and are transmitted only if the BB credit count is less than the remote buffer to buffer credit parameter.

FIG. 4 is an exemplary high level block diagram of a fibre channel concentrator integrated circuit hardware in accordance with a preferred embodiment of the present invention. In this example, within the fibre channel concentrator 202 in FIG. 2 are four independent FC link data paths 432a/434a, 432b/434b, 432c/434c and 432d/434d with independent link state machines 422a, 422b, 422c and 422d, respectively. Link state machines 422a, 422b, 422c and 422d may provide output to buffer memory control block 420. In addition, there are separate blocks for main state machine 402, buffer management/forwarder 426, frame cracking header 404 and control interface 406.

In this example, FC link interface blocks 401a, 401b, 401c and 401d within concentrator 202 in FIG. 2 may be identical. Each link interface 401a, 401b, 401c and 401d may be divided into, for example, three main functions. For example, receive data path 434a, transmit data path 432a and link state machine 422a comprise link interface 401a. Data paths 432a and 434a may be independent and unidirectional. Flow control information may be passed between the data paths. Link state machine 422a may be used to execute link initialization and error recovery protocols.

Link state machines 422a, 422b, 422c and 422d execute the link initialization and error recovery protocols. Link state machines 422a, 422b, 422c and 422d monitor the primitive sequences detected by a receive data path, for example receive data path 434a, to generate ordered sets based on the current link state. Frame buffer SRAM controller 420 controls access to an external frame buffer synchronous SRAM via write data path 412, address path 414 and read data path 416. Frame buffer SRAM controller 420 accepts separate buffer address from transmit and receive data paths from FC links 401a, 401b, 401c and 401d, as well as write data from each receive data path. Each data path may be guaranteed one-fourth of the total access bandwidth. An acknowledge message is passed to each data path to enable data read/write from a FIFO's and address increment.

Buffer management/forwarder 426 maintains the buffer queues for each of the FC links. Buffer management/forwarder 426 communicates to transmit data paths 432a, 432b, 432c and 432d as to where the transmit data paths' next transmit buffer is located and communicates to receive data paths 434a, 434b, 434c and 434d where to store incoming frames. Buffer management/forwarder 426 directs the forwarding of received frames to the proper transmitter based on the input from frame header crack 404.

Frame header crack 404 examines the contents of each frame transmitted and received from a local port. Frame header crack 404 specifically checks for FLOGI and PLOGI frames and the corresponding ACK frames which may be used for special login sequences. Frame header crack 404 extracts BB credit parameters from the frames during initialization and passes the BB credit parameters to the individual FC link controllers. Frame header crack 404 also captures during login the destination ID of the external link so that when normal frames are received from the local link the identifier can be compared and the frame forwarded to the proper destination.

Main state machine 402 coordinates the initialization of concentrator 202 as a whole, including reset, online/offline enabling, and special login sequences. Main state machine 402 monitors the individual link states and receives input from frame header crack 404. Control interface 406 supports external I2C interface 408 protocol allowing access to internal registers and status.

FIG. 5 is an exemplary flow diagram describing the states of fibre channel concentrator main state machine during the link initialization process in accordance with a preferred embodiment of the present invention. In this example, the operation starts with powering up the system (step 502). The main_reset state is entered (step 504) and then a determination is made as to whether or not both local links and external links are offline (step 506). If both local links and external links are in the offline state (step 506:YES), the links are forced offline (step 508) and the operation returns to step 504 where the main_reset state is entered. If both the local link and the external links are not in the offline state (step 506:NO), the incoming signal is monitored (step 510). Then a determination is made as to whether or not the local links and one or more external links are alive (step 512). If the local link and one or more external links are not alive (step 512:NO), the operation returns to step 510 where the incoming signal is monitored.

If the local link and one or more external links are alive (step 512:YES), the operation advances to the main_online state (step 514). The links are turned online (step 516) and then the link state initialization protocol is activated (step 518). The progression through link state initialization protocol is allowed to proceed (step 5206). Then a determination is made as to whether or not the system is in the main_active state (step 522). If the system is not in the main_active state (step 522:NO), the operation returns to step 520 where the progression through the link state initialization protocol is allowed. If the system is in the main_active state (step 522:YES), the system allows frame traffic to flow (step 524). Then a determination is made as to whether the local link or all of the external links are not active (step 526).

If the local link and one or more of the external links are active (step 526:NO), the operation returns to step 524 where the frame traffic is allowed to flow. If the local link or all of the external links are not active (step 526:YES), the main_offline state is entered (step 528). The links are forced offline (step 530) and then a determination is made as to whether or not the links have completed offline protocol (step 532). If the links have not completed offline protocol (step 532:NO), the operation returns to step 530 where the links are forced offline. If the links have completed offline protocol (step 532:YES), the operation returns to step 504 where the main_reset state is entered.

Figure 6A:
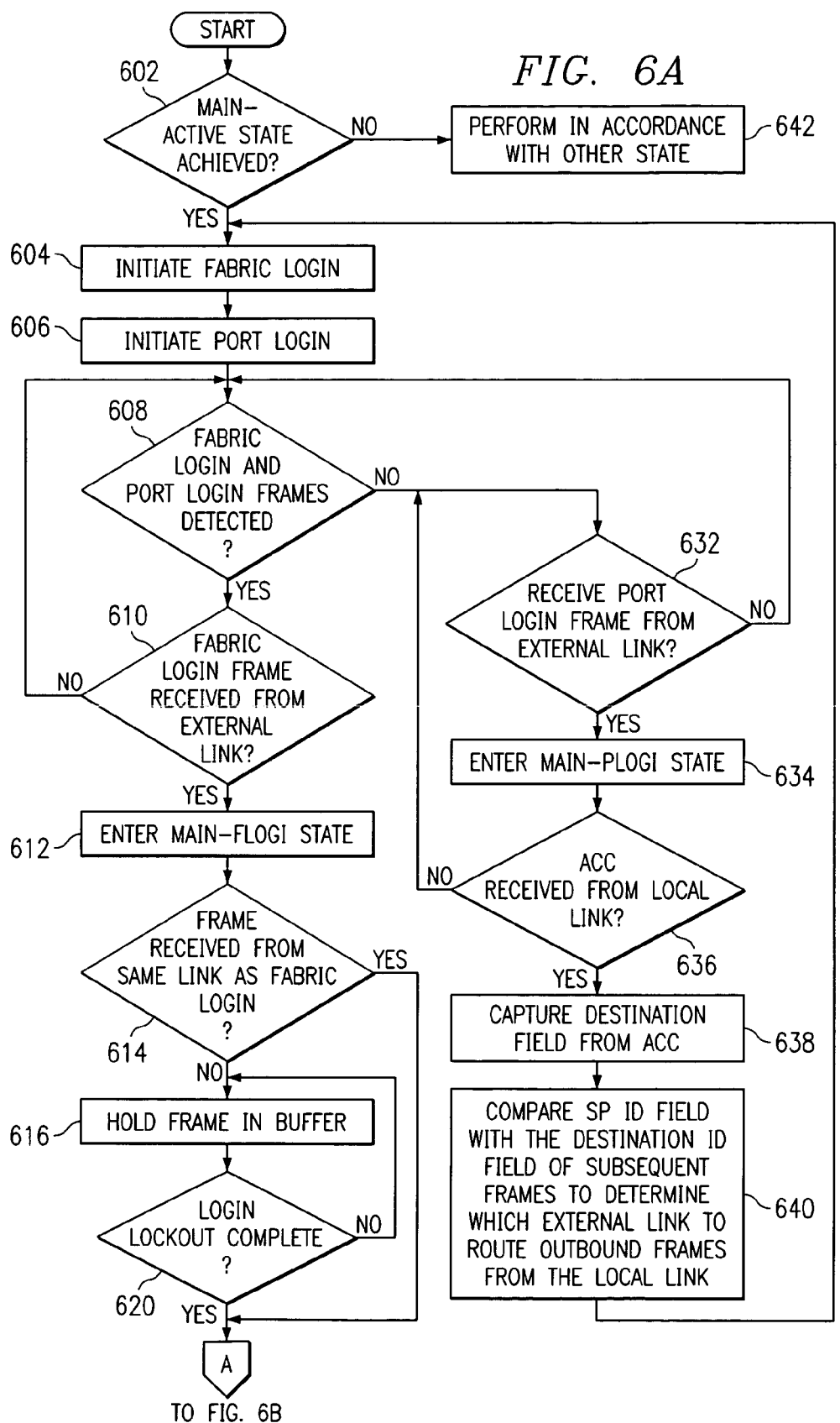

FIGS. 6A and 6B are exemplary flow diagrams describing the login initialization during a main active state in accordance with a preferred embodiment of the present invention. In this example, the operation begins with a determination as to whether or not the main_active state has been achieved (step 602). If the main_active state has not been achieved (step 602:NO), the operation performs in accordance with any other achieved states (step 642). If the main_active state has been achieved (step 602:YES), fabric login is initiated (step 604). Then port login is initiated (step 606). Then a determination is made as to whether or not fabric login and port login frames are detected (step 608). If fabric login and port login frames are not detected (step 608:NO), the operation continues to determine as to whether or not fabric login and port login frames have been detected (step 608). If fabric login and port login frames have been detected (step 608:YES), a determination is made as to whether or not a fabric login frame has been received from an external link (step 610). If a fabric login frame has not been received from an external link (step 610:NO), the operation returns to step 608 where a determination is made as to whether or not fabric login and port login frames have been detected.

If a fabric login frame has been received from an external link (step 610:YES), the main_flogi state is entered (step 612). Then a determination is made as to whether or not a frame has been received from the same link as the fabric login (step 614). If a frame has not been received from the same link as the fabric login (step 614:NO), the frame is held in a buffer (step 616). Then a determination is made as to whether or not a login lockout is complete (step 620). If the login lockout is not complete (step 620:NO), the operation returns to step 616 where the frame is held in a buffer. If the login lockout is complete (step 620:YES), the frame is forwarded to the local link (step 618).

Returning to step 614, if the frame is received from the same link as the fabric login (step 614:YES), the frame is forwarded to the local link (step 618). The frames from the local link are received (step 622) and then a determination is made as to whether or not the frames are to be forwarded to the initiating fabric login external link (step 626). If the frames are not to be forwarded to the initiating fabric login external link (step 626:NO), the frames received from the local links are forwarded to the appropriate external link as indicated by the destination identifier (step 630) and thereafter the operation terminates. If the frames are to be forwarded to the initiating fabric login external link (step 626:YES), then the frames are forwarded to the initiating fabric login external link (step 628) and thereafter the operation terminates.

Returning to step 608, if the fabric login and port login frames are not detected (step 608:NO), a determination is made as to whether or not the port login frame has been received from the external link (step 632). If the port login frame has not been received from the external link (step 632:NO), the operation returns to step 608 in which to determine as to whether or not the fabric and port login frames have been detected. If the port login frame has been received from the external link (step 632:YES), the main_plogi state is entered (step 634). Then a determination is made as to whether or not the login acknowledge (Acc) has been received from the local link (step 636). If the "Acc" has not been received from the local link (step 636:NO), the operation returns to step 632 where a determination is made as to whether or not the port login frame has been received from the external link. If the "Acc" has been received from the local link (step 636:YES), the destination field is captured from the login acknowledge (acc) (step 638). The destination identifier is then compared with the destination field of subsequent frames to determine which external link to route outbound frames from the local link (step 640) and thereafter the operation returns to step 604 where the fabric login is initiated.

FIG. 7 is an exemplary flow diagram describing the reception of a fabric login frame when the fibre channel concentrator is not in the login lockout state in accordance with a preferred embodiment of the present invention. In this example, the operation starts with a determination as to whether or not a frame is received from a local link (step 702). If a frame is not received from a local link (step 702:NO), the operation terminates. If a frame is received from a local link (step 702:YES), a determination is made as to whether or not the system is in the login lockout stage (step 704). If the system is not in the login lockout stage (step 704:NO), the frame is stored and the operation returns to step 704 to determine whether or not the system is in the login lockout stage. If the system is in the login lockout stage (step 704:YES), a determination is made as to whether or not the destination identifier of the local link matches the destination identifier of the external link (step 706).

If the destination identifier of the local link does not match the destination identifier of the external link (step 706:NO), the frame is stored (step 710) and the operation returns to step 704 to determine whether the system is in login lockout stage. If the destination identifier of the local link does match the destination identifier of the external link (step 706:YES), the frame is forwarded to the associated external link (step 708) and thereafter the operation terminates.

Therefore, the present invention provides the ability to connect a plurality of hosts to a single fibre channel link without the need of an external switch. This provides connectivity benefits such as, for example, using as much of the available bandwidth as possible, mitigating the costs of the data path and no reduction in performance in which the user may see greater host/device connectivity at a lower cost per port.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for transferring data from a plurality of host data links to at least one local data link, the method comprising the steps of:
   initializing a data bridge, wherein the data bridge is functionally connected on a first end to the plurality of host data links and on a second end to the at least one local data link, and wherein all connections to the data bridge are made through fibre channel ports;
   operating the data bridge to capture credit parameters, for use in determining if a first data link within the plurality of host data links and a second data link within the at least one local data link initiate a login parameter; and
   automatically transferring the data from a source data link within the plurality of host data links to a target data link within the at least one local data link based on the login parameter, wherein the data transferred from the source data link is stored in a memory buffer device, and wherein the memory buffer device is connected to the data bridge.

2. The method of claim 1, wherein the memory buffer device is connected to the data bridge via a memory buffer controller, and the memory buffer device and the memory buffer controller are both connected to the source data link through an input port of the data bridge, and are also both connected between the source data link and the target data link.

3. The method of claim 1, wherein the data bridge is a data link concentrator.

4. The method of claim 1, wherein initializing the data bridge includes resetting the data bridge.

5. The method of claim 4, wherein if the data bridge is reset, the plurality of host data links functionally connected to the data bridge and the at least one local data link functionally connected to the data bridge are forced offline by the data bridge.

6. The method of claim 4, further comprising:
monitoring a signal from the first data link within the plurality of host data links and a signal from the second data link within the at least one local data link functionally connected to the data bridge;
determining whether an initiating sequence signal is received by the first data link and the second data link; and
establishing a data bridge active state if the initiating sequence signal is received by the first data link and the second data link.

7. The method of claim 6, further comprising:
terminating data transfer from the source data link within the plurality of host data links to the target data link within the at least one local data link if the data bridge is in an offline state.

8. The method of claim 6, further comprising:
monitoring the plurality of host data links and the at least one local data link functionally connected to the data bridge; and
terminating data transfer from the source data link to the target data link if the plurality of host data links or the at least one local data link does not remain in an active state.

9. The method of claim 8, wherein if the plurality of host data links and the at least one local data link complete an offline state protocol, the data bridge is reset.

10. The method of claim 1, wherein the login parameter includes a fibre channel fabric login parameter and a fibre channel part login parameter.

11. The method of claim 10, wherein the fibre channel login parameter includes buffer credits.

12. The method of claim 10, wherein the fibre channel port parameter includes a port identification.

13. The method of claim 1, further comprising:
automatically transferring the data from a source data link within the plurality of host data links to a buffer device if the data bridge is in a lockout mode.

14. An apparatus for transferring data from a plurality of host data links to at least one local data link, comprising:
and array of data links; and
a data bridge coupled on a first end to the plurality of host data links and one second end to the at least one local data link, wherein the data bridge is initialized, wherein all connections to the data bridge are made through fibre channel ports, the data bridge determines if a first data link within the plurality of host data links ad a second data link within the at least one local data link initiate a login parameter, and the data bridge automatically transfers the data from a source data link within the plurality of host data links to a target data link within the at least one local data link based on the login parameter, wherein the data transferred from the source link is stored in a memory buffer device, and wherein the memory buffer device is connected to the data bridge.

15. The apparatus of claim 14, wherein the memory buffer device is connected to the data bridge via a memory buffer controller, and the memory buffer device and the memory buffer controller are both connected to the source data link through an input port of the data bridge, and are also both connected between the source data link and the target data link.

16. The apparatus of claim 14, wherein the data bridge is a data link concentrator.

17. The apparatus of claim 14, wherein initializing the data bridge includes resetting the data bridge.

18. The apparatus of claim 17, wherein if the data bridge is reset, the plurality of host data links functionally connected to the data bridge and the at lest one local data link functionally connected to the data bridge are forced offline by the data bridge.

19. The apparatus of claim 17, wherein if the data bridge monitors a signal from the first data link and a signal from the second data link functionally connected to the data bridge, the data bridge determines whether an initiating sequence signal is received by the first data link and the second data link, a data bridge active state is established if the initiating sequence signal is received by the first data link and the second data link.

20. The apparatus of claim 19, wherein the data bridge terminates data transfer from the source data link to the target data link if the data bridge is in an offline state.

21. The apparatus of claim 19, wherein the data bridge monitors the plurality of host data links and the at least one local data link functionally connected to the data bridge and the data bridge terminates data transfer from the source data link to the target data link if the plurality of host data links or the at least one local data link does not remain in an active state.

22. The apparatus of claim 21, wherein if the plurality of host data links and the at least one local data link complete an offline state protocol, the data bridge is reset.

23. The apparatus of claim 14, wherein the login parameter includes a fibre channel fabric login parameter and a fibre channel port login parameter.

24. The apparatus of claim 23, wherein the fibre channel login parameter includes buffer credits.

25. The apparatus of claim 23, wherein the fibre channel port parameter includes a port identification.

26. The apparatus of claim 14, wherein the data bridge automatically transfers the data from a source data link to a buffer device if the data bridge is in a lockout mode.

* * * * *